April 5, 1949.        S. T. STOOTHOFF        2,466,185
FLUSH-PIN GAUGE
Filed June 12, 1945
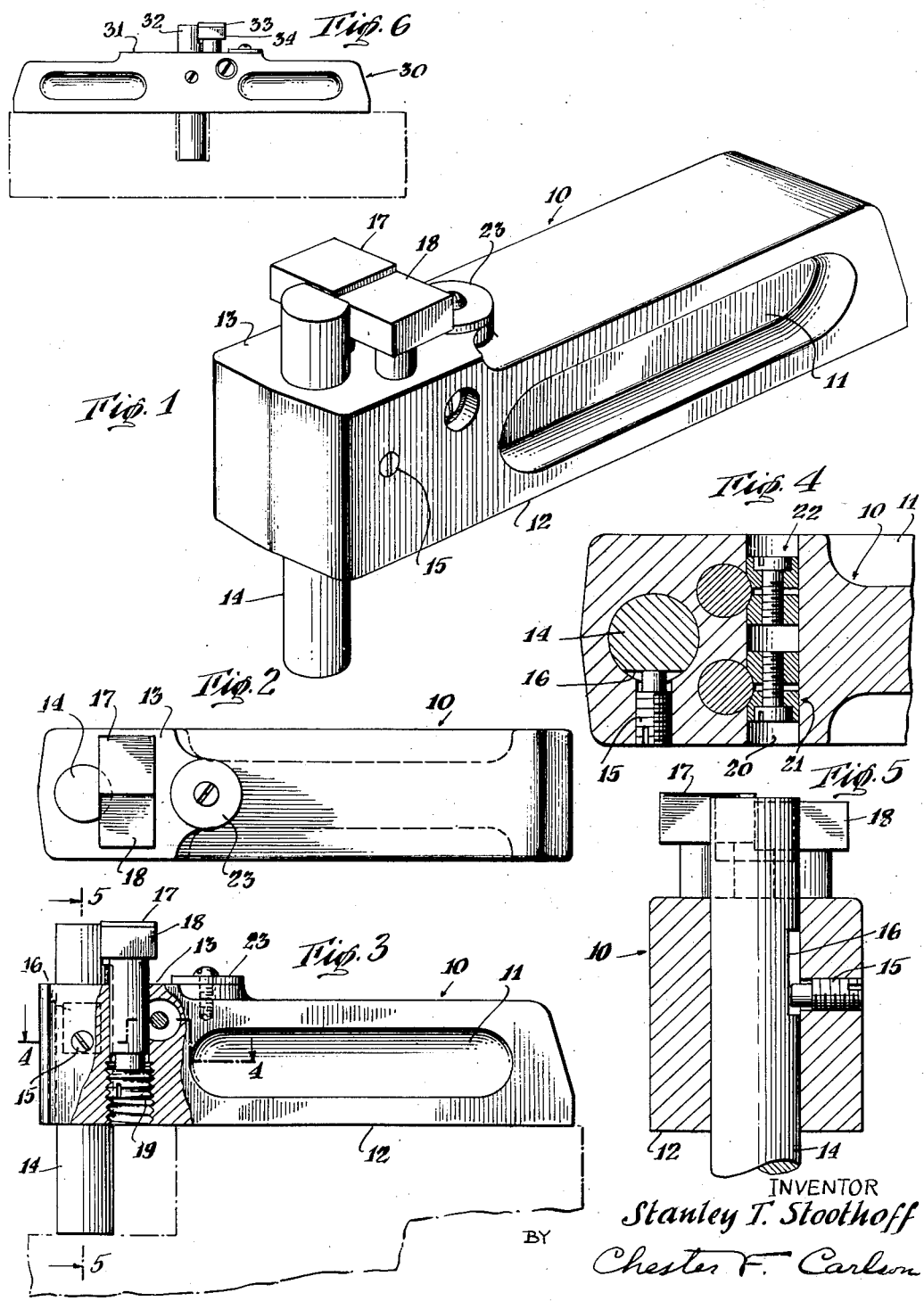
INVENTOR
Stanley T. Stoothoff
BY Chester F. Carlson
ATTORNEY Patented Apr. 5, 1949

2,466,185

UNITED STATES PATENT OFFICE 2,466,185

FLUSH-PIN GAUGE

Stanley T. Stoothoff, Glen Rock, N. J.

Application June 12, 1945, Serial No. 599,052

5 Claims. (Cl. 33—169)

This invention relates to gages and particularly to flush-pin gages for checking the distance between two surfaces.

An object of the invention is to improve flush pin gages.

Other objects of the invention will be apparent from the description and claims.

In the drawings:

Figure 1 is a perspective view of a flush-pin gage embodying features of the invention;

Figure 2 is a top view thereof;

Figure 3 is a side elevation thereof, partly in section, and also illustrates one mode of using the gage;

Figure 4 is a section on the line 4—4 of Figure 3;

Figure 5 is a section on the line 5—5 of Figure 3; and

Figure 6 is a side elevation of a modified gage, also illustrating one method of use.

Flush pin gages have been used heretofore in large numbers. The usual construction is shown, for example, on page 65 of the National Bureau of Standards pamphlet on "Gage Blanks" (third edition) Commercial Standard CS8-41. These comprise a body having a through hole and a sliding pin in the hole which projects from a face of the body a distance equal to the dimension to be gaged when the opposite or indicating end of the pin is flush with the opposite face of the body. The indicating end of the pin has a step of depth equal to the tolerance on the dimension gaged. It will be apparent that each gage is made for gaging only one dimension. Each time a gage is needed, it is necesary to make one to the dimension desired, involving considerable expense and time for making drawings, and machining the gage to exact dimensions.

The present invention contemplates a flush-pin gage with adjustable or settable flush surfaces whereby the gage may be set to measure any depth dimension within a given range of values and the tolerance may also be adjusted to any value desired. The invention also contemplates further features of construction and arrangement of parts, which promote simplicity of manufacture and greater ease of use.

Referring to the drawings, the gage shown in Figures 1, 2 and 3 comprises an elongated, generally rectangular body 10. This may be formed, for example, as a steel or nickel steel drop forging containing elongated side recesses 11 to reduce its weight and to afford convenience in handling. The bottom plane work-engaging face 12 of the body is preferably hardened by case hardening, flame hardening, induction hardening or other methods to increase its wear resistance. If desired, this surface may be faced with hardened steel plates.

The upper face of the body is formed with a slightly raised plane platform 13 at one end. A cylindrical through-hole passes the body near its end intersecting working face 12 and platform 13.

A cylindrical hardened steel pin 14 is slidably mounted in this hole. The longitudinal travel of the pin is limited by the tip of a stop screw 15 which extends through the side wall of the body 10 into a short flat recess 16 milled in the side of the pin 14.

A pair of indicating buttons 17 and 18 having rectangular heads and cylindrical shanks are mounted side by side immediately adjacent the indicating end of pin 14 which extends above platform 13. The shanks extend into holes in body 10 parallel to pin 14. The upper portions of these holes have a slip fit with the shanks of the buttons and the lower portions are threaded to accommodate adjusting screws, such as screw 19 (Fig. 3).

A transverse hole 20 in the gage body 10 intersects one side of the holes in which buttons 17 and 18 are mounted. A pair of locking assemblies 21 and 22, each comprising a screw, a collar and a nut, are mounted in the hole 20. The collar and nut of each assembly are provided with wedging surfaces for engaging a portion of the shank of one of buttons 17 and 18 between them where the shank intersects hole 20. By tightening the screws it is thus possible to lock buttons 17 and 18 firmly in position after they have been set at the required heights by turning adjusting screws 19.

It will be noted that the indicating end of pin 14 has a flat on one side adjacent the buttons 17 and 18 so that the buttons and pin together form a 3-way or T-shaped intersection.

The gage is set for checking a given dimension by use of standard blocks. The indicating buttons 17 and 18 are set at heights whose difference is equal to the permissible tolerance to be allowed in the dimension to be measured. The adjusting screws are then sealed in with wax and the dimension and tolerance are stamped on a marking disc 23, which is screwed onto the top of the body 10 for identification.

The gage is used for checking the distance between two surfaces, such as a step or a recess, by engaging the two surfaces with the end of the pin 14 and the work-engaging face 12 of the gage body. The dimension is determined to be within or outside the tolerance by drawing the finger nail or finger across the indicating end of the pin 14 and buttons 17 and 18. Slight differences in level of these surfaces are readily detected by this method. The 3-way T-shaped intersection provides convenience in checking the height of the pin by merely drawing the finger nail first across the intersection of the pin face and the button 17, then across the intersection of the pin face with that of button 18. The tolerance dimension can also be checked at the junction of 17 and 18 when the gage is set.

Figure 6 shows a modified gage which is especially suitable for measuring the depths of recesses, as illustrated by the dash lines in the figure. This gage comprises a body 30 having a central table portion 31 through which pin 32 extends and on which gaging buttons 33 and 34 are mounted. The structure is otherwise similar to that of Figure 1.

The invention, while described in a specific embodiment, is intended to be construed broadly within the spirit and scope of the appended claims.

What is claimed is:

1. A flush pin gage comprising a body having a through hole, a slidable pin in said hole and extending out from opposite faces of said body, and a pair of indicating buttons having shanks and means for clamping and unclamping said shanks in said body with said buttons above one of said faces and closely adjacent said pin, said buttons and pin having parallel plane ends to permit manual comparison of their relative heights.

2. A flush pin gage comprising a body having a through hole, a slidable pin in said hole and extending out from opposite faces of said body, and a pair of indicating buttons having shanks and screw means for clamping and unclamping said shanks in said body, screw means for moving said shanks longitudinally prior to clamping, said buttons being disposed above one of said faces and closely adjacent said pin, said buttons and pin having parallel plane ends to permit comparison of their relative heights.

3. A flush pin gage comprising a body having a work-engaging face, an upper face opposite thereto and a through hole extending through said body between said faces, a slidable pin in said hole and extending out of said body from both of said faces, a pair of indicating buttons having shanks clamped in said body and extending out from said upper face parallel to said pin, said buttons having plane upper faces and said pin having a plane upper end, said buttons disposed closely beside said pin, and means for clamping and unclamping the shanks of said buttons in said body and for moving said shanks longitudinally to permit adjustment of the height of said buttons.

4. A flush pin gage comprising a body having a plane work-engaging face, an upper face opposite thereto and a through hole extending through said body between said faces perpendicular to said work-engaging face, a slidable pin in said hole and extending out of said body from both of said faces, said pin having a cut-out section along one side at an intermediate position and a stop pin mounted in said body and projecting into said through hole to limit the longitudinal travel of said pin, a pair of indicating buttons having shanks clamped in said body and extending out from said upper face parallel to said pin, said buttons having plane upper faces and said pin having a plane upper end, said buttons being disposed side by side and both closely beside said pin, the adjacent edges of said buttons and said pin forming a 3-way intersection, and means for clamping and unclamping the shanks of said buttons in said body and for moving said shanks longitudinally to permit adjustment of the height of said buttons, whereby said buttons can be set at heights corresponding to the tolerance limits of a dimension to be checked by said pin.

5. A flush-pin gage comprising a body having a plane work-engaging face, an upper face opposite thereto and a through hole extending through said body between said faces perpendicular to said work-engaging face, a slidable pin in said hole and extending out of said body from both of said faces, said pin having a cut-out section along one side at an intermediate position and a stop pin mounted in said body and projecting into said through hole to limit the longitudinal travel of said pin, a pair of indicating buttons having shanks clamped in said body and extending out from said upper face parallel to said pin, said buttons having plane upper faces and said pin having a plane upper end, said buttons being disposed side by side with adjacent edges parallel and both said buttons being disposed beside said pin with the edges thereof adjacent said pin being parallel to a side wall of said pin, and means for clamping and unclamping the shanks of said buttons in said body and for moving said shanks longitudinally to permit adjustment of the height of said buttons, whereby said buttons can be set at heights corresponding to the tolerance limits of a dimension to be checked by said pin.

STANLEY T. STOOTHOFF.

REFERENCES CITED

The following references are of record in the file of this patent:

UNITED STATES PATENTS

| Number | Name | Date |
|---|---|---|
| 1,667,809 | Kershaw | May 1, 1928 |
| 2,337,690 | Stern | Dec. 28, 1943 |

OTHER REFERENCES

Machinery (magazine), p. 911, July 1926.
American Machinist, pp. 110–11, Feb. 1, 1945.